July 29, 1947.  B. H. MOSES  2,424,767
VETERINARIAN'S INSTRUMENT
Filed May 17, 1946
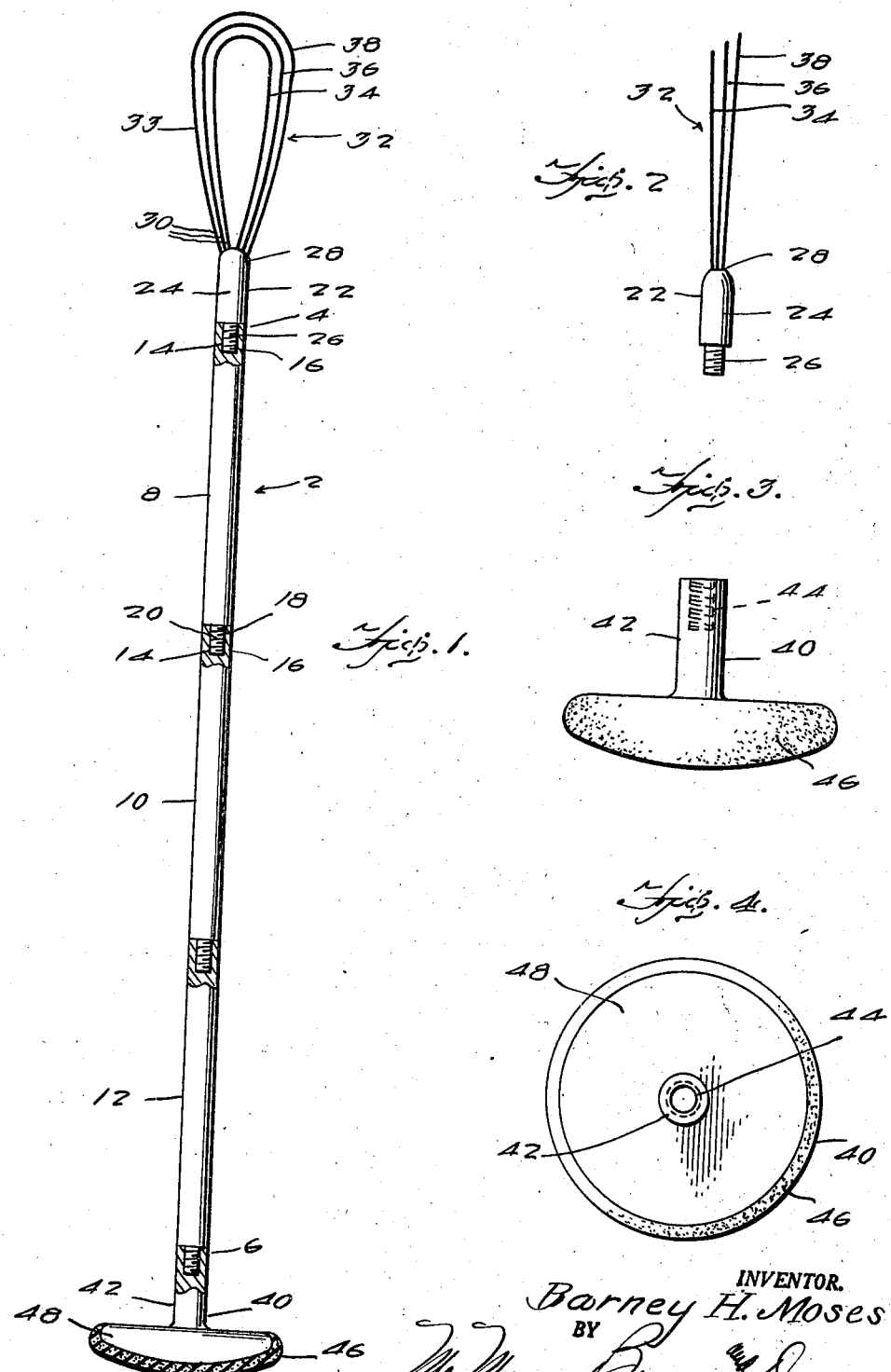
INVENTOR.
Barney H. Moses Patented July 29, 1947

2,424,767

UNITED STATES PATENT OFFICE 2,424,767

VETERINARIAN'S INSTRUMENT

Barney H. Moses, De Ridder, La.

Application May 17, 1946, Serial No. 670,333

1 Claim. (Cl. 128—356)

This invention relates to instruments for reaching into an animal's throat and removing foreign objects which are choking the animal.

An object of the invention is to provide a simple and effective device for removing foreign objects from the throat of an animal quickly and humanely.

Another object of the invention is to provide a device for removing foreign objects from the throat of an animal of any size, the device being capable of being adjusted for animals of different sizes.

A further object of the invention is to provide an animal unchoke device which is capable of being taken apart and fitted into the veterinarian's case for ease of transportation and then quickly and securely assembled for use as required.

Another object of the invention is to provide an animal unchoke device which has a plurality of separable fittings for use with animals of different sizes and types, and for removing various kinds of choking objects.

Still another object of the invention is to provide an animal unchoke device which has provision for either pulling the choking obstruction out of the animal's throat, or of pushing the foreign object down into the animal's stomach.

Other objects and advantages of my invention will become apparent from the following description of a preferred embodiment thereof as illustrated in the accompanying drawings, and in which:

Figure 1 is a front elevation of my improved animal unchoke device,

Figure 2 is a side elevation of one of the loop end fittings used in the device shown in Figure 1, Figure 3 is a front elevation of one of the sponge end fittings used in the device shown in Figure 1, and Figure 4 is a plan view of the sponge fitting shown in Figure 3.

As shown in the drawings, there is a main staff 2 extending from location 4 to location 6 and formed of a number of individual sections or segments such as 8, 10 and 12. Each staff segment has a threaded recess or socket 14 at its upper end 16, and has its lower end 18 reduced and threaded to form a lower extension 20, each lower extension 20 being threadedly receivable in the socket 14 of the next lower staff segment, thereby being capable of being secured thereto to form a main staff 2 of a number of staff segments.

A loop end fitting 22 has a main body portion 24 substantially cylindrical in contour, which has a reduced lower extension 26 threaded to fit securely into the upper socket 14 of the uppermost or forward end staff segment 8. Secured to the upper end 28 of the main body portion 24 are the ends 30 of a number of wire loops indicated generally at 32, the wire loops being formed of spring steel wire which is preferably corrosion resistant. As will be observed, when there are three wire loops 34, 36 and 38 in the loop end fitting, and this number has been found to be effective, the outer loop 38 is slightly larger than the loops 34 and 36, that is to say, according to one preferred example, there is about one-half inch more length of wire in the outer loop 38. The lower ends 30 of the wire loops may be secured to the upper end 28 of the main body portion 24 in any suitable manner which forms a very smooth joint and does not impair the flexibility of the loops themselves, and this may be done by soldering, welding, or other means.

To operate on animals of different sizes, such as cows, horses, sheep, and others, there will be provided a set of loop end fittings of graduated sizes of loops so that the proper loop end fitting with its correct size of loop may be quickly screwed into the upper socket of upper staff segment 8.

At the lower end of the main staff, there is a sponge end fitting 40 having a cylindrical main body portion 42 with a socket 44 for threadedly receiving the lower extension 20 of the lowermost staff segment 12, there being provided a number of sponge end fittings 40 having the same size of main body portion 42, but differing in that the sizes of the sponge end portions are graduated to accommodate animals of different sizes. As shown, the sponge end comprises a soft sponge 45 secured at its central portion 48 to the lower end of the main body portion 42 which extends into the sponge a short distance for being the more securely attached thereto against dislodgement of the sponge.

To use the unchoke device, the following procedure is preferred. The main staff sections 8, 10 and 12, which may each be about twenty inches long, are joined together at their screw joints as already described, and the appropriate size of end loop fitting for the animal and type of obstruction selected from the case and threaded into the upper socket of staff section 8. Similarly the appropriate size of sponge end fitting is selected and threaded on to the lower end of staff section 12. The mouth of the animal is held open by means of a speculum, with the animal's head and neck held stright, its tongue being drawn forward out the side of the mouth. Then the operator, with his right hand, passes the instrument, loop end first, down the throat, pressing the sides 33 of the loops against the side wall of the oesophagus so as to partly collapse the flexible loops, until the loops just pass the foreign object in the animal's throat. Then the side pressure on sides 33 of the loops is released, allowing the loops to spread out, the left hand being on the outside of the animal's throat over the object, thus allowing the operator to place the foreign object directly within the loop, which object is then drawn gently out through the animal's mouth. This operation can be performed in an amazingly short period of time, and does not harm the animal in the least. This method is very successful in bovine practice and I have also used it with very gratifying results in equine practice.

Now, on the other hand, if the object, which may be a turnip, apple, beet, ear of corn, sweet potato, white potato, or the like, is lodged far down in the animal's throat, or even in the chest cavity near the stomach, and can not be advantageously and beneficially looped with the loop ends of the device, it may be preferable to try to push the object down into the stomach by use of the sponge end of the device, the latter end being round, soft and smooth. In this method, the sponge end is inserted into the animal's mouth in the same manner as described above and pressed gently down the animal's throat until the foreign object is reached. Then it is pressed very gently on and on, until it is in the stomach. This technique is also easy and very successful in bovine practice, but must be performed with great care in equine practice.

In one preferred embodiment of the invention which may be mentioned by way of example, the overall length of the device is about 72 inches, being made up of three sections 8, 10 and 12 which are each about twenty inches long, the loop ends being about ten inches long and the sponge ends being about five inches in length.

Although a preferred embodiment of my invention has been described in specific terms, it is to be understood that various changes may be made in size, shape, materials and arrangement without departing from the spirit and scope of the invention as claimed.

I claim:

A veterinary instrument, comprising a plurality of interchangeable and attachable staff sections, each section having a male attaching portion at one end and a matching female attaching portion at the other, whereby any number of sections may be joined to constitute a staff of a desired length, and an operating instrument attached to one end of the staff, the said operating instrument consisting of a plurality of wire loops of different size and in fixed parallel planes.

BARNEY H. MOSES.

REFERENCES CITED

The following references are of record in the file of this patent:

UNITED STATES PATENTS

| Number | Name | Date |
|---|---|---|
| 631,646 | Lauer | Aug. 22, 1899 |
| 892,472 | Walker | July 7, 1908 |
| 1,054,960 | Butner | Mar. 4, 1913 |

FOREIGN PATENTS

| Number | Country | Date |
|---|---|---|
| 377,537 | Germany | July 28, 1923 |